United States Patent
Cheon et al.

(10) Patent No.: US 8,185,163 B2
(45) Date of Patent: May 22, 2012

(54) MOBILE COMMUNICATION DEVICE AND METHOD OF CONTROLLING THE SAME

(75) Inventors: Jee Young Cheon, Seoul (KR); Kyung Dong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1108 days.

(21) Appl. No.: 12/045,533

(22) Filed: Mar. 10, 2008

(65) Prior Publication Data

US 2008/0227503 A1    Sep. 18, 2008

(30) Foreign Application Priority Data

Mar. 14, 2007   (KR) .................. 10-2007-0024984

(51) Int. Cl.
*H04B 1/38* (2006.01)
*H04M 1/00* (2006.01)

(52) U.S. Cl. ..................................... 455/566; 455/550.1

(58) Field of Classification Search ............... 455/550.1, 455/575.1–575.4, 566, 420; 345/163, 164, 345/167, 173
See application file for complete search history.

(56) References Cited

U.S. PATENT DOCUMENTS

| 6,097,372 | A | 8/2000 | Suzuki |
| 2003/0098885 | A1* | 5/2003 | Yabe .............................. 345/785 |
| 2005/0124387 | A1* | 6/2005 | Ribeiro et al. ................ 455/566 |
| 2005/0156898 | A1* | 7/2005 | Yoshioka ....................... 345/169 |
| 2008/0212272 | A1* | 9/2008 | Hollander ...................... 361/681 |

FOREIGN PATENT DOCUMENTS

| CN | 1422054 A | 6/2003 |
| CN | 1688958 A | 10/2005 |
| GB | 2 355 145 A | 4/2001 |
| JP | 04-205408 A | 7/1992 |

* cited by examiner

*Primary Examiner* — Michael Faragalla
(74) *Attorney, Agent, or Firm* — Birch, Stewart, Kolasch & Birch, LLP

(57) ABSTRACT

A mobile communication device, method and computer program product for generating a first signal upon manipulation of a first input key that can be manipulated in at least two directions, generating a second signal upon manipulation of a second input key which enables at least two direction inputs, and controlling a predetermined operation in response to at least one of the first and second signals.

14 Claims, 8 Drawing Sheets

MOBILE COMMUNICATION DEVICE AND METHOD OF CONTROLLING THE SAME

This application claims priority from Korean Patent Application No. 10-2007-0024984, filed on Mar. 14, 2007 in the Korean Intellectual Property Office, the disclosure of which is incorporated herein by reference in its entirety.

BACKGROUND OF THE INVENTION

1. Field of the Invention

The present invention relates to a mobile communication device which is capable of performing a variety of control operations using a first input key that can be manipulated in at least two directions and a second input key that enables at least two direction inputs, and a method of controlling the mobile communication device.

2. Description of the Related Alt

With recent improvements in mobile communication technology and the development of various mobile platforms, an increasing number of mobile communication devices are becoming able to perform a variety of additional service functions as well as basic functions such as voice call and Short Message Service (SMS) functions. In particular, due to the commercialization of mobile communication devices that support wireless Internet functions and multimedia functions, mobile communication devices have evolved into high-performance, multifunctional devices.

In the meantime, the design of mobile communication devices must ensure both portability and mobility, no matter how efficient and multifunctional mobile communication devices have become. In addition, there is a clear limit in allocating space to input/output devices such as display devices or input devices for mobile communication devices. Thus, in order to effectively utilize limited space of mobile communication devices, various types of input keys such as function keys and navigation keys have been adopted to mobile communication devices.

However, input keys such as navigation keys are generally used as direction keys or used for selecting menus, and it is difficult to fully utilize various additional functions provided by mobile communication devices simply using such input keys. Therefore, it is necessary to develop methods of efficiently controlling an operation of a mobile communication device using various input keys.

SUMMARY OF THE INVENTION

The present invention provides a mobile communication device, method and computer program product for performing a variety of control operations using a first input key that can be manipulated in at least two directions and a second input key that enables at least two different direction inputs.

According to an aspect of the present invention, there is provided a method and computer program product for controlling a mobile communication device. The method includes generating a first signal upon manipulation of a first input key that can be manipulated in at least two directions, generating a second signal upon manipulation of a second input key that enables at least two direction inputs, and controlling a predetermined operation in response to at least one of the first and second signals.

The first input key may be at least one of a joystick key, a touch pad, a track ball, and a pointing stick.

The method may also include generating a third signal upon pressing down on the first input key.

According to another aspect of the present invention, there is provided a mobile communication device. The mobile communication device includes a first input key, a second input key, and a control unit. The first input key can be manipulated in at least two directions, and generates a first signal a first signal upon being manipulated. The second input key enables at least two direction inputs, and generates a second signal upon being manipulated. The control unit controls a predetermined operation in response to at least one of the first and second signals. A corresponding method and computer program product is also disclosed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

The present invention will hereinafter be described in detail with reference to the accompanying drawings in which exemplary embodiments of the invention are shown.

Figure 1:
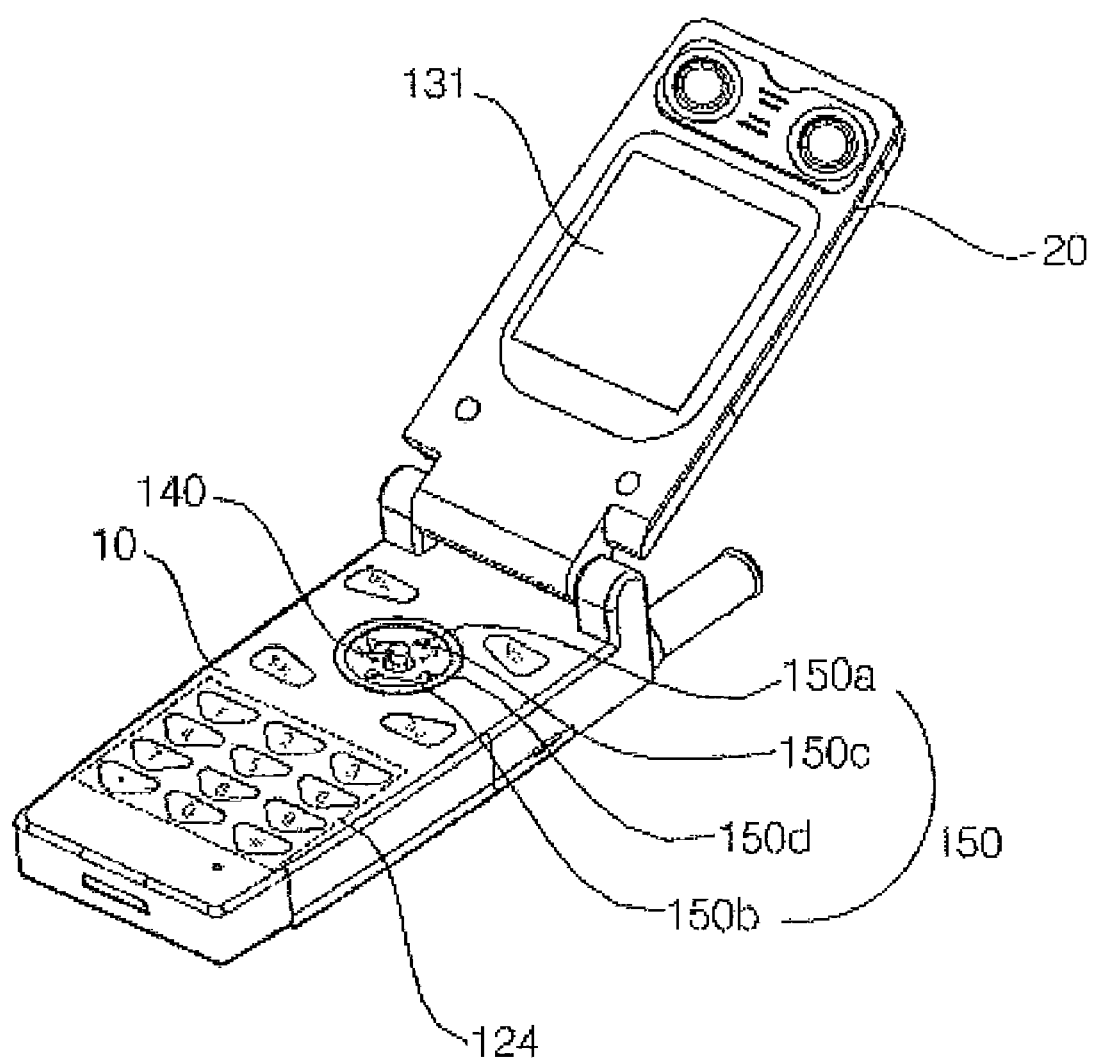
FIG. 1 illustrates a mobile communication device according to an embodiment of the present invention.

FIG. 1 illustrates a mobile communication device according to an embodiment of the present invention. Referring to FIG. 1, the mobile communication device 100 includes a main body 10 and a folder 20 that is connected to the main body 10 so that the mobile communication device can be opened up or closed. A display 131, for example, a liquid crystal display (LCD), and a plurality of number keys 124 are provided on a front surface of the main body 10. In another embodiment, there may be two units that slideably open and close.

The mobile communication device also includes a first input key 140 and a second input key 150. The first input key 140 may be a joystick key which can be horizontally manipulated in nearly all directions and can rotate 360 degrees about its axis. The second input key 150 includes an up key 150a, a down key 150b, a left key 150c, and a right key 150d.

Figure 2:
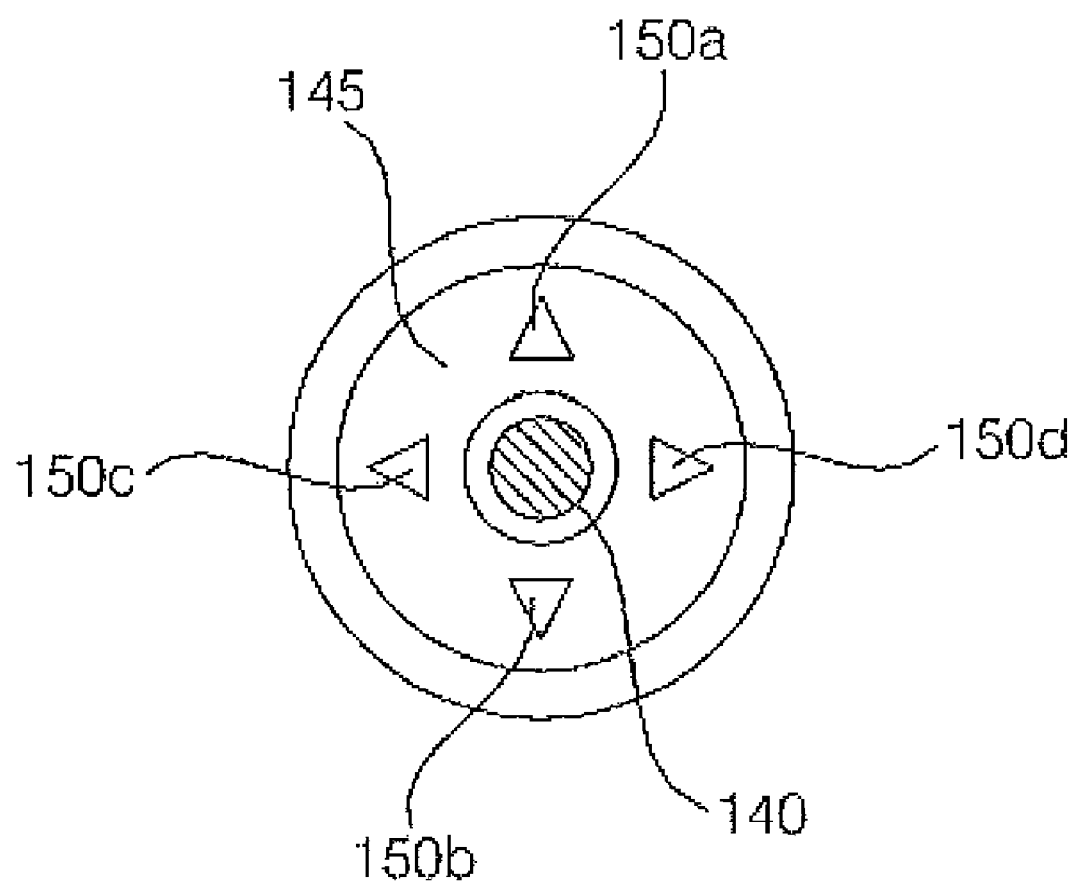
FIG. 2 illustrates a joystick key and direction keys illustrated in FIG. 1.

FIG. 2 illustrates the first input key 140 and the up, down, left, and right keys 150a, 150b, 150c, and 150d illustrated in FIG. 1. Referring to FIG. 2, when the first input key 140 is manipulated, the first input key 140 generates a signal corresponding to the direction and amount of the manipulation of the first input key 140. The first input key 140 may be pressed down. The second input key 150 generates a signal indicating which of the up, down, left, and right keys 150a, 150b, 150c, and 150d has been pressed down and a signal indicating the amount of time for whichever of the up, down, left, and right keys 150a, 150b, 150c, and 150d is determined to have been pressed down. The second input key 150 may be implemented as a touch wheel that is formed in an area 145 that surrounds the external circumference of the first input key 140. A combination of the signals output by the first input key 140 and the second input key 150 may be used to perform various operations such as screen control or operation control.

The first input key 140 is illustrated in FIGS. 1 and 2 as being a joystick key, but the present invention is not restricted thereto. In other words, an input device, other than a joystick key, for example, a track ball, a pointing stick or a touch pad, may be used as the first input key 140. The second input key 150 is illustrated in FIGS. 1 and 2 as being comprised of four direction keys. However, the second input key 150 may include at least two direction keys, for example, up and down keys or left and right keys.

In another embodiment, a different arrangement of keys may be used. For example, first and second keys 140 and 150 may be moveable in directions parallel to each other, rather than in orthogonal directions.

Figure 3:
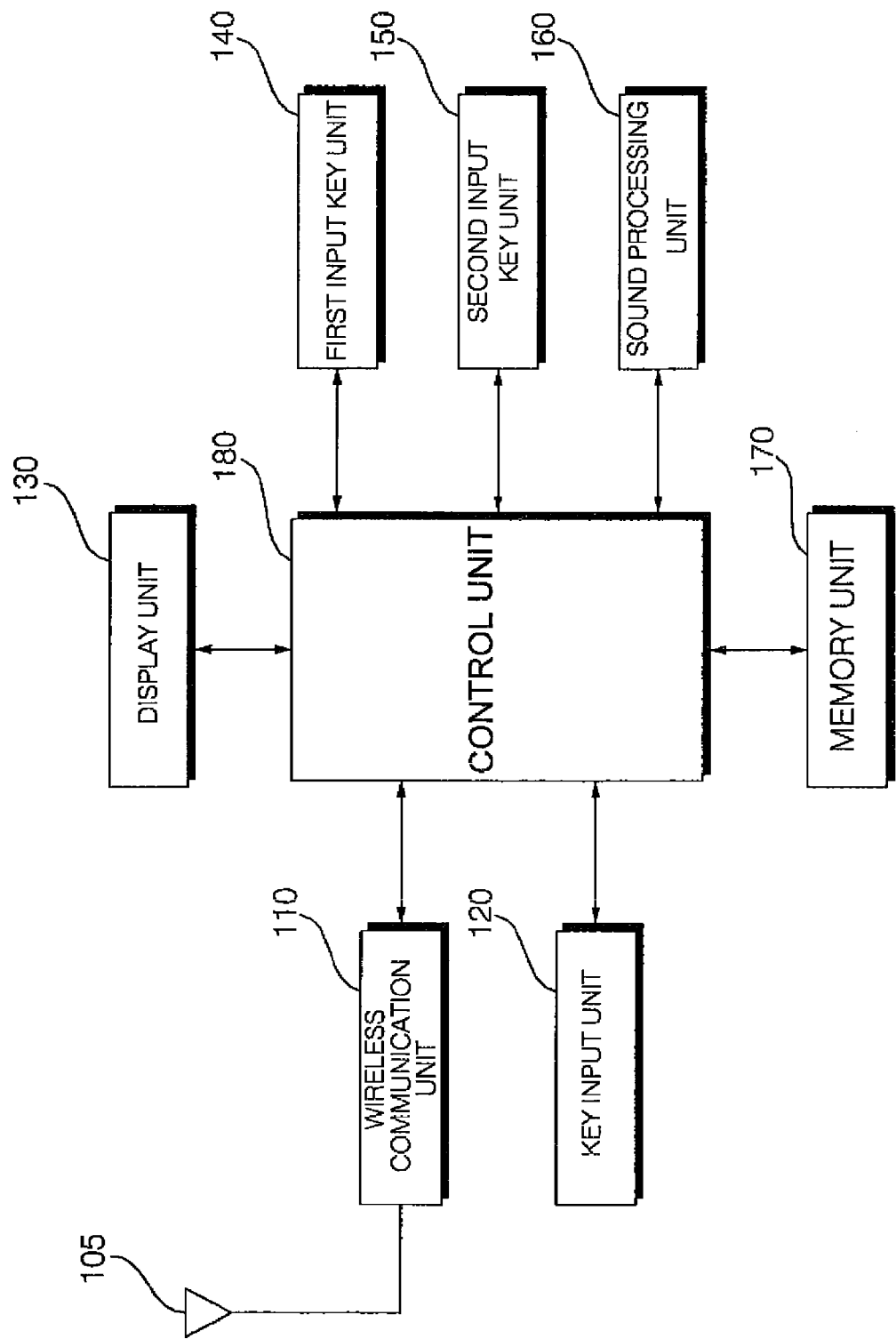
FIG. 3 is a block diagram of a mobile communication device according to an embodiment of the present invention.

FIG. 3 is a block diagram of a mobile communication device according to an embodiment of the present invention. Referring to FIG. 3, the mobile communication device includes a wireless communication unit 110, a key input unit 120, a display unit 130, a first input key 140, a second input key 150, a sound processing unit 160, a memory unit 170, and a control unit 180.

The wireless communication unit 110 provides an interface for wireless communication with a base station via an antenna 105. The wireless communication unit 110 includes a duplex filter for filtering a signal received through the antenna 105, a power amplifier for amplifying a signal, a frequency up-convert circuit in a transmission path, a frequency down-convert circuit in a reception path, and etc.

The key input unit 120 includes a plurality of keys, including number keys and function keys. The key input unit 120 transmits a signal corresponding to a key hit by a user to the control unit 180 and receives an operation command or data from the user.

The display unit 130 includes an LCD window and displays menus for controlling an operation of the mobile communication device and other information such as a state of a received call, battery information, and etc.

The first input key 140 may be horizontally manipulated in nearly all directions by rotating 360 degrees about its axis, like a joystick key or a track ball. When the first input key 140 is manipulated, the first input key 140 outputs a first signal indicating the direction and the amount of the manipulation of the first input key 140. When being pressed down or being manipulated, other than being pressed down, the second input key 150 outputs second signals indicating a direction input made upon manipulation of the second input key 150 and indicating an amount of time for which the second input key 150 has been manipulated to produce the direction input.

If the first input key 140 is pressed down, the first input key 140 may output a third signal. In this case, the third signal output by the first input key 140 may be used to switch an operating mode of the second input key 150.

The sound processing unit 160 may amplify a sound signal output by the control unit 180 and output the amplified sound signal to speakers. The sound processing unit 160 may convert a sound signal input via a microphone into an electrical signal and transmit the electrical signal to the control unit 180. The sound processing unit 160 may reproduce, under the control of the control unit 180, a music file that is selected from among a plurality of music files present in the memory unit 170.

The memory unit 170 stores programs or data necessary for the operation of the mobile communication device or other various data that the user wants to store. The memory unit 170 may store image files, music files, or game programs.

The control unit 180 controls the operations of the wireless communication unit 110, the key input unit 120, the display unit 130, the first input key 140, the second input key 150, the sound processing unit 160, and the memory unit 170. The control unit 180 combines a signal transmitted by the first input key 140 and a signal transmitted by the second input key 150 and performs various operations according to the result of the combination.

Figure 4:
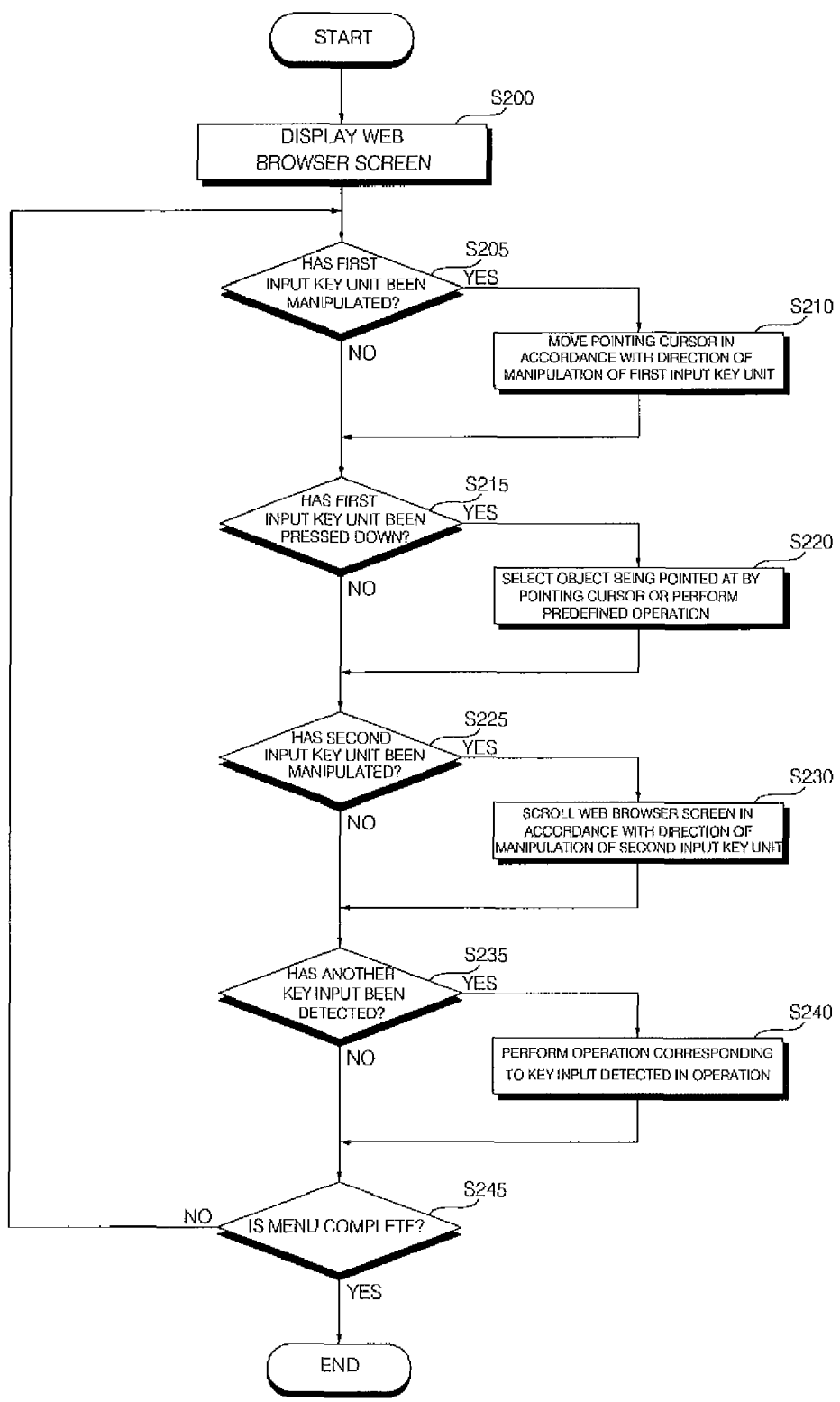
FIG. 4 is a flowchart illustrating a method of controlling a mobile communication device according to an embodiment of the present invention.

FIG. 4 is a flowchart illustrating a method of controlling a mobile communication device according to an embodiment of the present invention. Referring to FIG. 4, when a user selects a menu for, for example, accessing the Internet, using the key input unit 120 and executes the selected menu, the display unit 130 displays a web browser screen under the control of the control unit 180 (S200).

If the first input key is manipulated in a predetermined direction when the web browser screen is displayed, the control unit 180 controls a pointing cursor displayed on the web browser screen to be moved in accordance with the direction of the manipulation of the first input key 140 (S210). The pointing cursor may be displayed on the web browser screen as an arrow, a blinking under bar, a rectangular bar, or another geometrical figure desired by the user.

If the first input key 140 is pressed down (S215), the control unit 180 either selects an object being pointed at by the pointing cursor on the web browser screen or controls a predetermined operation to be performed (S220). In other words, an operation corresponding to a mouse click may be performed by pressing down on the first input key 140. More specifically, if the first input key 140 is pressed down, all object being pointed at by the pointing cursor may be selected. Then, if the first input key 140 is pressed down again, a program corresponding to the selected object may be executed or a predetermined operation, for example, the display of a web page linked to the selected object on the web browser screen, may be performed. Alternatively, the selection of an object being pointed at by the pointing cursor and the execution of an operation corresponding to the pointed-to-object may both be performed simply by pressing down on the first input key 140 once.

When the second input key 150 is manipulated (S225), the control unit 180 controls the web browser screen to be scrolled in a direction corresponding to a direction input made via the second input key 150 (S230). More specifically, if the direction input via the second input key 150 is an upward direction, the control unit 180 controls the web browser screen to be scrolled up. If the direction input via the second input key 150 is a downward direction, the control unit 180 controls the web browser screen to be scrolled down. If the direction input via the second input key 150 is a leftward direction, the control unit 180 controls the web browser screen to be scrolled left. If the direction input via the second input key 150 is a rightward direction, the control unit 180 controls the web browser screen to be scrolled right. The control unit 180 may control the speed of scrolling the web browser screen to increase proportionally to the amount of time for which the second input key 150 is pressed down.

If a key input made via an input key unit, other than the first input key 140 and the second input key 150, is detected (S235), the control unit 180 controls a predefined operation corresponding to the key input detected in operation S235 to be performed (S240). Operations S205 through S240 may be repeatedly performed until the execution of the selected menu is complete (S245).

The web browser screen may be controlled by using the first input key 140 to perform the functions of a mouse and using the second input key 150 to perform the functions of a screen scroll key.

Figure 5:
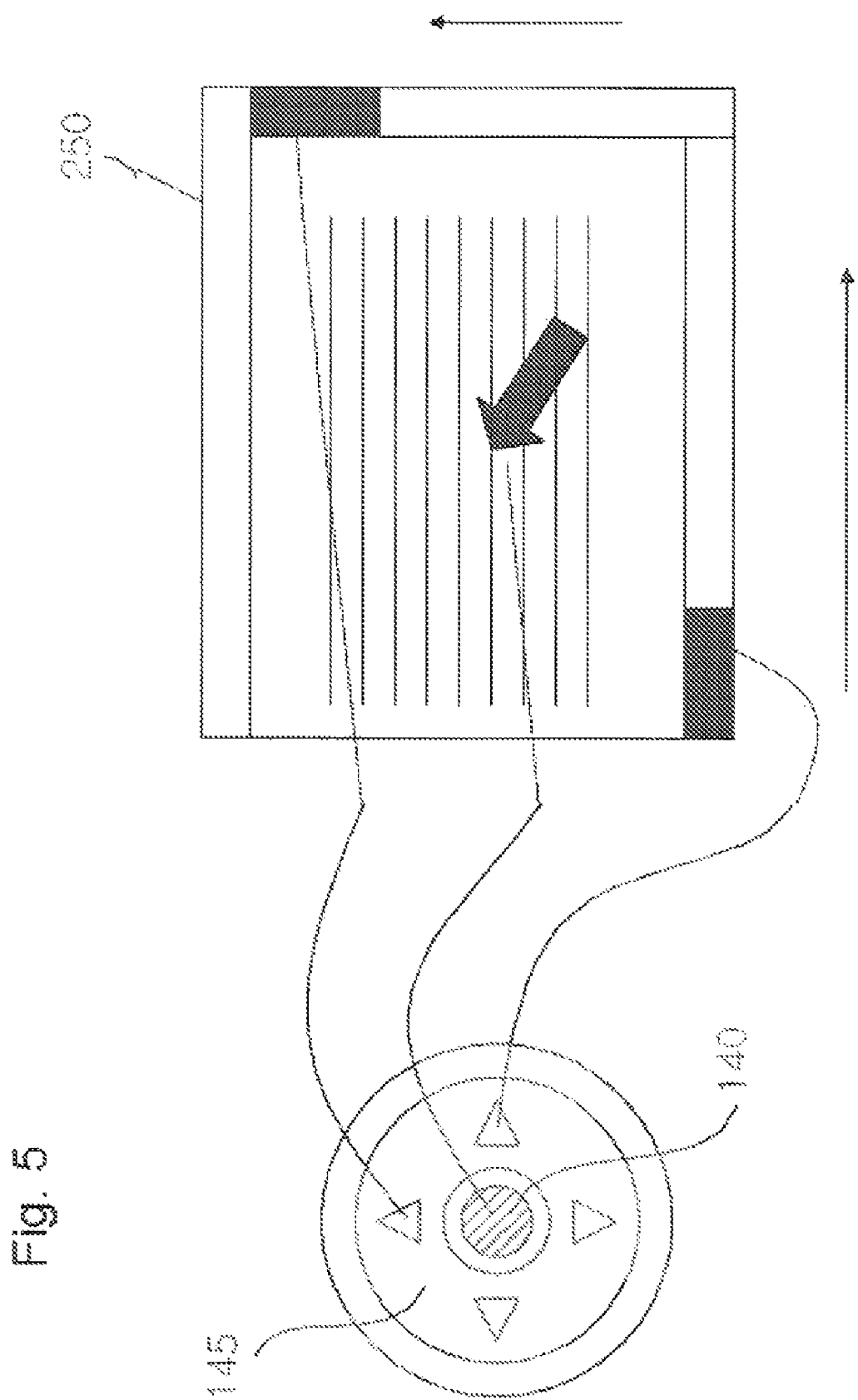
FIG. 5 illustrates a web browser screen and explains the method illustrated in FIG. 4.

FIG. 5 illustrates a web browser screen 250 and explains the method illustrated in FIG. 4. Referring to FIG. 5, a pointing cursor displayed on the web browser screen 250 is moved upon manipulation of the first input key 140. If an upward direction input made via the second input key 150 is detected, the web browser screen 250 may be scrolled up. If a leftward direction input made via the second input key 150 is detected, the web browser screen 250 may be scrolled left.

Figure 6:
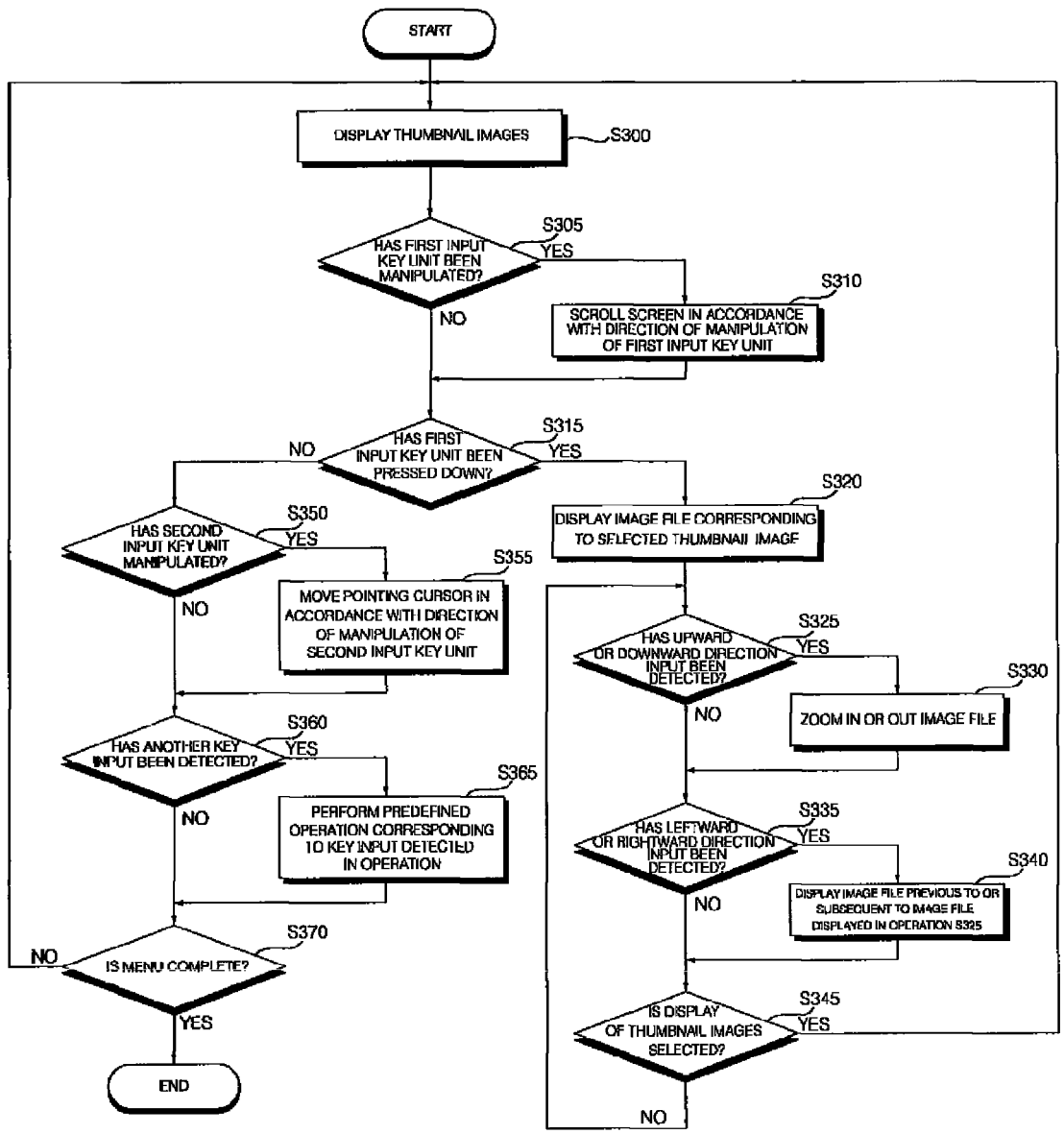
FIG. 6 is a flowchart illustrating a method of controlling a mobile communication device according to another embodiment of the present invent.

FIG. 6 is a flowchart illustrating a method of controlling a mobile communication device according to another embodiment of the present invention. Specifically, FIG. 6 illustrates how to control the display of an image file using the first input key 140 and the second input key 150.

Referring to FIG. 6, when a user selects a menu, such as a photo album menu, via the key input unit 120 and executes the selected menu, the display unit 130 displays, under the control of the control unit 180, a plurality of thumbnail images respectively corresponding to a plurality of image files present in the memory unit 170 on a screen (S300). If a key input made by manipulating the first input key 140 is detected when the thumbnail images are displayed on the screen, the control unit 180 controls the screen to be scrolled in accordance with the direction of the manipulation of the first input key 140 (S310).

If a key input made by manipulating the second input key 150 is detected with no further key input made via the first input key 140 (S350), the control unit 180 moves a pointing cursor on the screen in accordance with the direction of the manipulation of the second input key 150 in order to select one of the thumbnail images displayed on the screen (S355). If a key input made via an input key unit, other than the first input key 140 and the second input key 150, is detected (S360), the control unit 180 controls a predefined operation corresponding to the key input detected in operation S360 to be performed (S365).

If it is determined in operation S315 that a further key input has been made by pressing down the first input key 140, the control unit 180 controls an image file corresponding to a thumbnail image currently being pointed at by the pointing cursor to be displayed on the entire screen (S320). If an upward or downward direction input made via the second input key 150 is detected when the image file corresponding to the pointed-to-thumbnail image is displayed on the entire screen, the control unit 180 controls the corresponding image file to be zoomed in or zoomed out according to the type of the direction input made via the second input key 150 (S330).

If a leftward or rightward direction input made via the second input key 150 is detected, the control unit 180 controls an image file previous to or subsequent to the image file corresponding to the pointed-to-thumbnail image to be displayed on the entire screen (S340). If the user wishes all the thumbnail images to be displayed back on the screen (S335), the method returns to operation S300. Operations S300 through S370 may be repeatedly performed until the execution of the selected menu is complete. By doing so, it is possible to effectively control the display of image files present in a mobile communication device.

Figure 7:
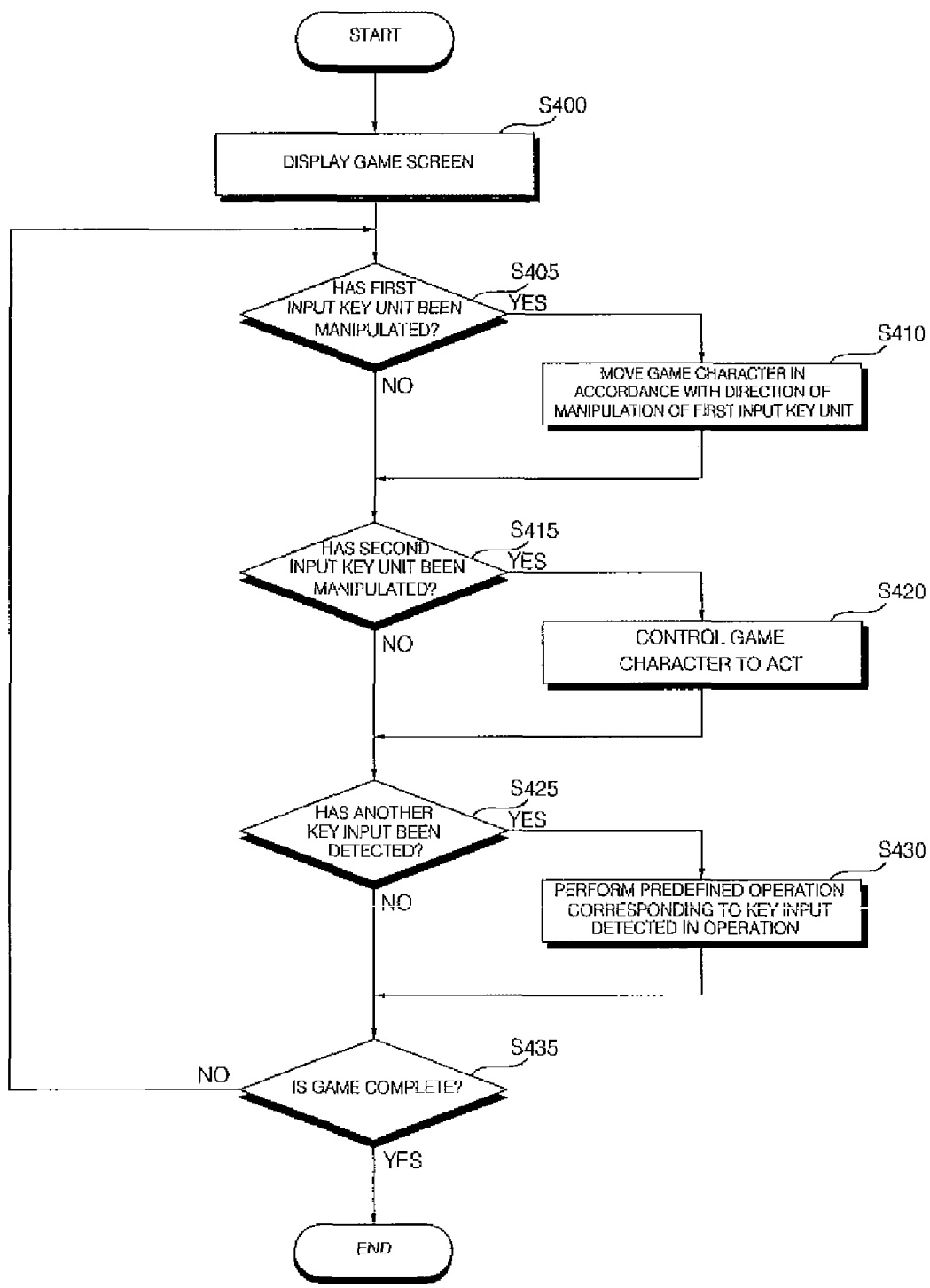
FIG. 7 is a flowchart illustrating a method of controlling a mobile communication device according to another embodiment of the present invent.

FIG. 7 is a flowchart illustrating a method of controlling a mobile communication device according to another embodiment of the present invention. Specifically, FIG. 7 illustrates how to control a game screen using the first input key 40 and the second input key 150.

Referring to FIG. 7, when a user selects a game menu via the key input unit 120 and executes a game program, the display unit 130 displays a game screen under the control of the control unit 180 (S400). If a key input made by manipulating the first input key 140 is detected (S405) when the game screen is displayed, the control unit 180 controls a game character displayed on the game screen to be moved in accordance with the direction of the manipulation of the first input key 140 (S410).

If a key input made by manipulating the second input key 150 is detected (S415), the control unit 180 controls the game character to act in accordance with the key input detected in operation S415, for example, to launch an attack or defense (S420). If a key input made via an input key unit, other than the first input key 140 and the second input key 150, is detected (S425), the control unit 180 controls a predefined operation corresponding to the key input detected in operation S425 regarding the game program to be performed (S430).

Operations S405 through S435 may be repeatedly performed until the execution of the game program is complete. By doing so, it is possible for a mobile communication device to easily control a game screen.

Figure 8:
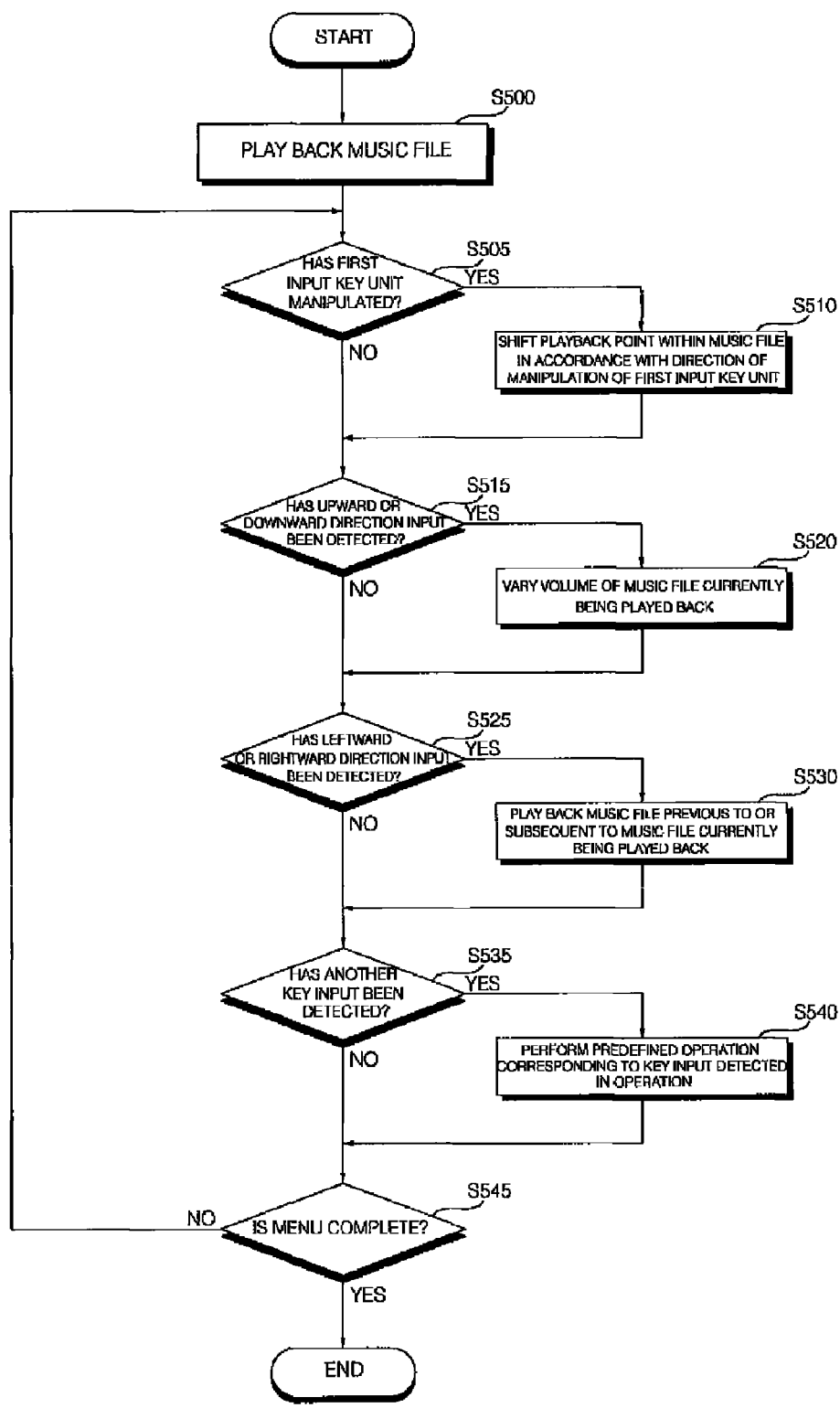
FIG. 8 is a flowchart illustrating a method of controlling a mobile communication device according to another embodiment of the present invent.

FIG. 8 is a flowchart illustrating a method of controlling a mobile communication device according to another embodiment of the present invention. Specifically, FIG. 8 illustrates how to control the playback of a music file using the first input key 140 and the second input key 150.

Referring to FIG. 8, when a user selects a music file via the key input unit 120 and requests playback of the selected music file, the sound processing unit 160 plays back the selected music file under the control of the control unit 180 (S500). If a key input made by manipulating the first input key 140 is detected during the playback of the selected music file (S505), the control unit 180 shifts a playback point within the selected music file in accordance with the direction of the manipulation of the first input key 140 (S510). For example, if the first input key 140 is manipulated rightward, the control unit 180 may perform a fast forward seek function on the selected music file. On the other hand, if the first input key 140 is manipulated leftward, the control unit 180 may perform a fast backward seek function on the selected music file.

If an upward or downward direction input made via the second input key 150 is detected (S515), the control unit 180 increases or reduces the volume of the selected music file according to whether the direction input detected in operation S515 is an upward or downward direction input (S520). If a leftward or rightward direction input made via the second input key 150 is detected (S525), the control unit 180 may play back a music file previous to or subsequent to the selected music file to be played back according to whether the direction input detected in operation S525 is a leftward or rightward direction input (S530). If a key input made via an input key unit, other than the first input key 140 and the second input key 150, is detected (S535), the control unit 180 controls a predefined operation corresponding to the key input detected in operation S535 to be performed. Operations S505 through S540 may be repeatedly performed until a current menu for playing back a music file is complete. By doing so, it is possible to easily control the playback of music files.

As described above, according to the present invention, it is possible to effectively control, for example, a web browser screen or an image file viewer screen, and to effectively control various operations during the playback of a music file or the execution of a game program by using a first input key that can be manipulated in at least two directions and a second input key that enables at least two different direction inputs. Therefore, it is possible to efficiently control a mobile communication terminal with limited space and thus to maximize user convenience.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile communication device having a screen, a first input key which can be manipulated in at least two directions and a second input key which can be manipulated in at least two directions, the method comprising:
generating a first signal upon manipulation of the first input key;
generating a second signal upon manipulation of the second input key;
generating a third signal upon pressing down on the first input key; and
controlling a predetermined operation of the mobile communication device in response to the first, second and third signals, wherein the step of controlling includes
moving a pointing cursor displayed on the screen in response to the first signal,
scrolling the screen in response to the second signal, and
selecting an object being pointed at by the pointing cursor or switching an operation mode of the second input key upon the generation of the third signal,
wherein the first input key is one of a joystick key, a touch pad, a track ball, and a pointing stick,
displaying an image file corresponding to a thumbnail image being pointed at by the pointing cursor upon pressing down on the first input key; and
displaying at least one of an image file previous to an image file currently being displayed on the screen or an image file subsequent to the image file currently being displayed on the screen upon receipt of the second signal.

2. The method of claim 1, wherein the speed of scrolling the screen increases proportionally to an amount of time for which the second input device is pressed down.

3. The method of claim 1, wherein the screen is a web browser screen.

4. The method of claim 1, further comprising: varying the relative sizes of the thumbnail images; and displaying the thumbnail images according to the results of the variation.

5. The method of claim 1,
wherein the first signal is for moving a game character displayed on a game screen, and
wherein the second signal is for controlling the game character to act.

6. The method of claim 1, wherein the step of controlling comprises:
playing back a selected music file; and
controlling a playback point within the selected music file to be shifted upon receipt of the first signal.

7. The method of claim 6, further comprising:
playing back at least one of a music file previous to a music file currently being played back and a music file subsequent to the file currently being played back upon receipt of the second signal.

8. The method of claim 6, further comprising:
varying the volume of the music file currently being played back upon receipt of the second signal.

9. A mobile communication device, comprising:
a first input key configured to be manipulated in at least two directions and to generate a first signal upon being manipulated and a third signal upon pressing down on the first input key;
a second input key configured to be manipulated in at least two direction inputs and to generate a second signal upon being manipulated;
a control unit configured to control a predetermined operation in response to the first, second and third signals,
wherein the control unit is configured to control the predetermined operation by moving a pointing cursor displayed on the screen in response to the first signal,
scrolling the screen in response to the second signal,
selecting an object being pointed at by the pointing cursor or switching an operation mode of the second input key upon the generation of the third signal, and
wherein the first input keg is one of a joystick key, a touch pad, a track ball, and a pointing stick,
displaying an image file corresponding to a thumbnail image being pointed at by the pointing cursor upon pressing down on the first input key; and
displaying at least one of an image file previous to an image file currently being displayed on the screen or an image file subsequent to the image file currently being displayed on the screen upon receipt of the second signal.

10. The mobile communication device of claim 9, wherein the control unit is configured to move a game character displayed on a game screen in response to the first signal and to control an action of the game character in response to the second signal.

11. The mobile communication device of claim 9, further comprising:
a sound processing unit configured to play back a music file,
wherein the control unit is configured to control the sound processing unit to shift a playback point within the music file upon receipt of the first signal.

12. The mobile communication device of claim 10, wherein the control unit is configured to control the sound processing unit to vary the volume of the music file currently being played back upon receipt of the second signal.

13. The method of claim 1, wherein the first input key is located within a center area of the second input key.

14. The mobile communication device of claim 9, wherein the first input key is located within a center area of the second input key.

* * * * *